(12) United States Patent  (10) Patent No.: US 9,313,211 B1
Lototskiy  (45) Date of Patent: Apr. 12, 2016

(54) SYSTEMS AND METHODS TO PROTECT AGAINST A VULNERABILITY EVENT

(75) Inventor: Alexander Lototskiy, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 116 days.

(21) Appl. No.: 13/449,508

(22) Filed: Apr. 18, 2012

(51) Int. Cl.
*G06F 17/00* (2006.01)
*H04L 29/06* (2006.01)
*G06F 21/56* (2013.01)
*G06F 21/57* (2013.01)
*G06F 21/52* (2013.01)
*G06F 21/55* (2013.01)

(52) U.S. Cl.
CPC ............ *H04L 63/107* (2013.01); *G06F 21/566* (2013.01); *G06F 21/568* (2013.01); *H04L 63/20* (2013.01); *G06F 21/52* (2013.01); *G06F 21/55* (2013.01); *G06F 21/577* (2013.01); *G06F 2221/034* (2013.01)

(58) Field of Classification Search
CPC ..... H04L 63/107; H04L 63/20; G06F 21/568; G06F 21/566; G06F 21/577; G06F 2221/034; G06F 21/52; G06F 21/55
USPC .......................................................... 726/1
See application file for complete search history.

(56) References Cited

U.S. PATENT DOCUMENTS

| | | | |
|---|---|---|---|
| 6,151,643 A * | 11/2000 | Cheng | G06F 8/62 709/200 |
| 8,850,579 B1 * | 9/2014 | Kalinichenko | 726/23 |
| 2006/0107322 A1 * | 5/2006 | Kaniyar et al. | 726/23 |
| 2006/0174319 A1 * | 8/2006 | Kraemer et al. | 726/1 |
| 2008/0282347 A1 * | 11/2008 | Dadhia et al. | 726/22 |
| 2011/0083186 A1 * | 4/2011 | Niemela et al. | 726/24 |
| 2011/0093953 A1 * | 4/2011 | Kishore et al. | 726/24 |
| 2011/0209220 A1 * | 8/2011 | Tikkanen et al. | 726/24 |
| 2011/0252476 A1 * | 10/2011 | Loveland et al. | 726/24 |
| 2012/0079596 A1 * | 3/2012 | Thomas et al. | 726/24 |
| 2012/0115501 A1 * | 5/2012 | Zheng | 455/456.1 |
| 2012/0167162 A1 * | 6/2012 | Raleigh et al. | 726/1 |
| 2012/0185910 A1 * | 7/2012 | Miettinen et al. | 726/1 |
| 2012/0204266 A1 * | 8/2012 | Yoo | 726/24 |
| 2012/0255014 A1 * | 10/2012 | Sallam | 726/24 |
| 2012/0297488 A1 * | 11/2012 | Kapoor | H04L 63/145 726/24 |
| 2013/0139264 A1 * | 5/2013 | Brinkley et al. | 726/24 |
| 2013/0167235 A1 * | 6/2013 | Kapoor et al. | 726/24 |

* cited by examiner

*Primary Examiner* — Ashok Patel
*Assistant Examiner* — Gary Gracia
(74) *Attorney, Agent, or Firm* — Holland & Hart LLP

(57) ABSTRACT

A computer-implemented method to protect against a vulnerability event is described. A first set of security policies is enforced. A client device is monitored for a vulnerability event. Upon detecting a vulnerability event, a vulnerability level corresponding to a current environment is determined. A second set of security policies is selected based on the vulnerability level. The second set of security policies is enforced.

11 Claims, 11 Drawing Sheets

SYSTEMS AND METHODS TO PROTECT AGAINST A VULNERABILITY EVENT

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is desirable to anyone who uses and relies on computers.

Computer systems may be vulnerable to infection and/or attack by malicious entities. For example, computer systems may be vulnerable to infection and/or attack by malware, viruses, trojans, adware, hackers, etc. In some cases, a computer system that has been infected or attacked by a malicious entity may be unusable and/or impaired. For example, malicious entities may delete files, block access to resources, seek personal information, and generally wreak havoc on a computer system. Often computer systems will include protective measures to protect the computer system against malicious entities. However, malicious entities work to get around and/or patiently wait for opportunities to get around the protective measures. For example, malicious entities may wait for a moment of vulnerability before attempting an infection or attack.

SUMMARY

According to at least one embodiment, a computer-implemented method for protecting against a vulnerability event is described. A first set of security policies is enforced. A client device is monitored for a vulnerability event. Upon detecting a vulnerability event, a vulnerability level corresponding to a current environment is determined. A second set of security policies is selected based on the vulnerability level. The second set of security policies is enforced.

In some embodiments, the vulnerability event may include a termination of a host protection service. In one configuration, the termination of the host protection service may result from an operating system update. In another configuration, the termination of the host protection service may result from a host protection software update. In some configurations, monitoring for a vulnerability event may include monitoring an operating system for an operating system update and/or monitoring a host protection software for a host protection software update.

In some embodiments, the second set of security policies may be enforced upon the occurrence of the vulnerability event. Enforcing the second set of security policies may include switching from enforcing the first set of security policies to enforcing the second set of security policies.

In some embodiments, the client device may be monitored for an end of the vulnerability event. Upon detecting the end of the vulnerability event, the first set of security policies may be enforced. Enforcing the first set of security policies may include switching from enforcing the second set of security policies to enforcing the first set of security policies.

According to another embodiment, a computing device configured to protect against a vulnerability event is also described. The computing device includes a processor and memory in electronic communication with the processor. The memory stores computer executable instructions that when executed by the processor cause the processor to enforce a first set of security policies, and monitor a client device for a vulnerability event. Upon detecting the vulnerability event, the processor may determine a vulnerability level corresponding to a current environment. Further, the processor may select a second set of security policies based on the vulnerability level, and enforce the second set of security policies.

According to yet another embodiment, a computer-program product for protecting against a vulnerability event is additionally described. The computer-program product includes a non-transitory computer-readable storage medium that stores computer executable instructions. The computer executable instructions, when executed by a processor, cause the processor to enforce a first set of security policies, and monitor a client device for a vulnerability event. Upon detecting the vulnerability event, the processor may determine a vulnerability level corresponding to a current environment. Further, the processor may select a second set of security policies based on the vulnerability level, and enforce the second set of security policies.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
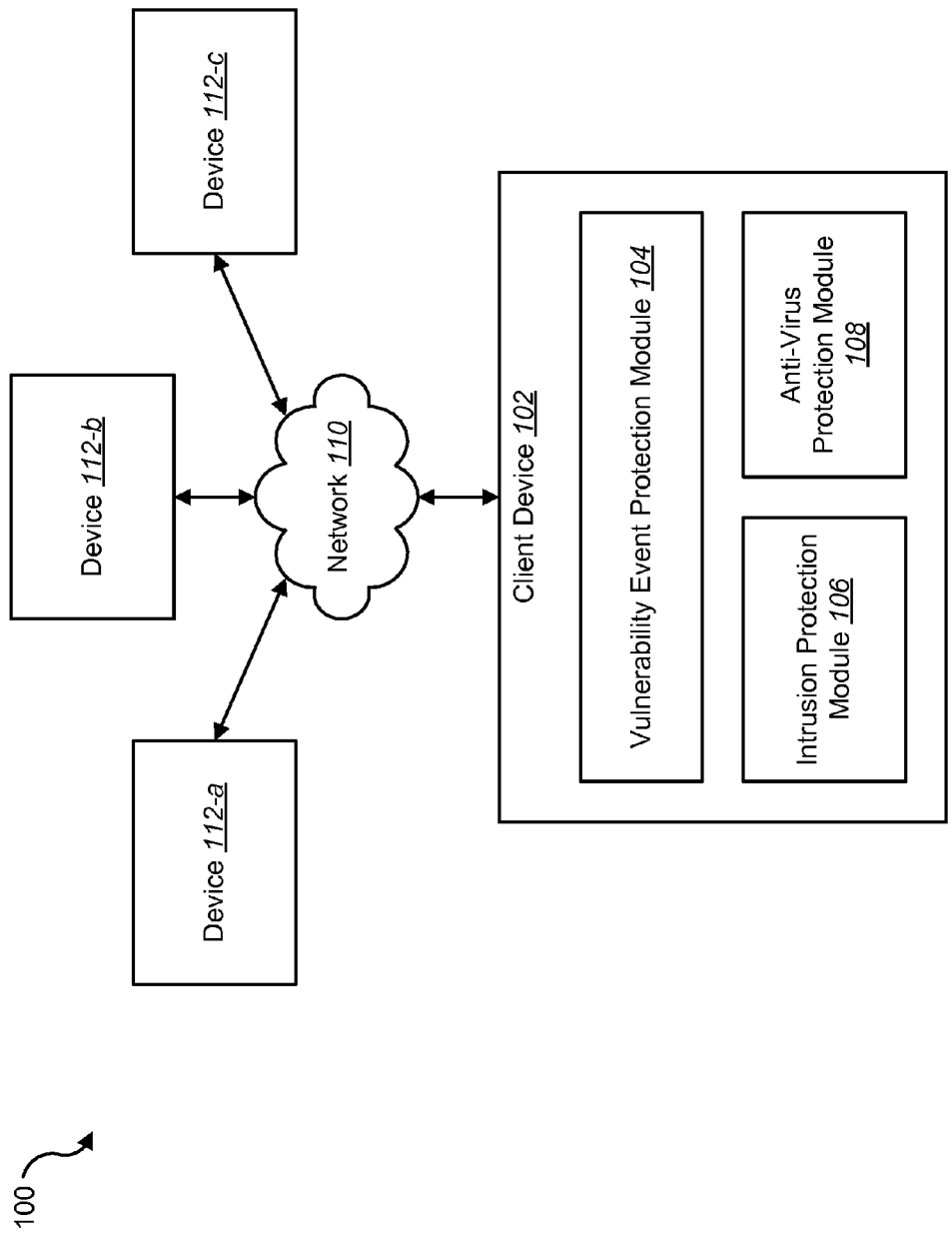
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In various situations, vulnerability events (e.g., possible security exposures) may occur even when host protection software is installed. For example, an operating system (OS) update and/or a host protection software update may result in a temporary disabling of one or more host protection services. For instance, an update may result in a host protection service being disabled or its driver being unloaded.

In some configurations, the systems and methods described herein may be used to apply increased secure policies during an OS update event (e.g., a Windows Update) and/or a host protection software update event (e.g., virus definitions update). Additionally or alternatively, the systems and methods described herein may be used to apply increased secure policies to protect a client device from vulnerabilities when a host protection service (e.g., a service that provides host protection) is disabled.

In some cases, an OS may become vulnerable for attacks when services critical for host protection are stopped (by the update process, for example) or when host protection software is temporary disabled (due to its driver update, for example). For instance, host protection software may not provide host protection when vulnerability signatures (e.g., virus definitions) are updated. In some configurations, the systems and methods described herein may detect OS update events and/or application (e.g., host protection software) update events and apply increased secure policies to protect against possible vulnerabilities that may occur if a host protection service is terminated. For example, enhanced security policies may be applied during these events to protect against vulnerabilities (e.g., detected vulnerabilities).

In some configurations, a current environment-awareness mechanism may be used. The current environment-awareness mechanism may enforce switching of security policies depending on the current environment and/or the vulnerability associated with the current environment. For example, the current environment-awareness mechanism may enforce stricter secure e.g., security policies when a host protection service is disabled. For instance, the stricter security policies (reducing the number of ports allowed to be open in a firewall policy, for example) may be enforced once an OS update or host protection software event (e.g., update event) is reported. When the corresponding update is finished, the current environment awareness mechanism may switch to the previously active current environment and correspondingly enforce the pre-update set of security policies. In some cases, an administrator may have the ability to define the level of severity of the security policies that should be enforced for the time when updates are being installed. In some examples, the systems and methods described herein may provide an ability to apply a set of dedicated security policies based on the status of an OS update and/or host protection software update.

In some configurations, an administrator may have the flexibility to define what security policies need to be enforced during a vulnerability event. For example, the administrator may create specific sets of security policies based on the current environment of the host. One example of a security policy is a policy that blocks access to shared folders or sensitive information on the host. The systems and methods described herein may be beneficial for applying any set of policies based on the detection of an OS update or an application update (e.g., Symantec Live Update).

FIG. 1 is a block diagram illustrating one embodiment of an environment 100 in which the present systems and methods may be implemented. In one example, a client device 102 may communicate with one or more devices 112 through a network 110. For example, the client device 102 may communicate with a first device 112-a, a second device 112-b, and/or a third device 112-c. In some embodiments, the client device 102 may be a device 112. In some configurations, one or more of the devices 112 (e.g., the client device 102) may host a malicious entity that is seeking to infect and/or attack its hosting device 112 and/or one or more of the other devices 112 (e.g., the client device 102). Examples of the client device 102 include servers, personal computers (PC), laptops, tablets, personal digital assistants (PDA), smartphones, mobile devices, any other types of computing devices, etc. Examples of devices 112 include client devices, servers, PCs, laptops, tablets, PDAs, smartphones, mobile devices, printers, network appliances, any other types of computing devices, etc. Examples of networks 110 include local area networks (LAN), wide area networks (WAN), virtual private networks (VPN), etc. In some configurations, the network 110 may be the internet.

In some configurations, the client device 102 may use a variety of host protection services to protect the client device 102 from vulnerabilities. Examples of host protection services include antivirus, antispyware, antimalware, firewall, intrusion protection, device control, and application control. In one embodiment, the client device 102 may include an intrusion protection module 106 and/or an antivirus protection module 108. The intrusion protection module 106 may be one example of a host protection service. In some configurations, the intrusion protection module 106 may monitor communications over the network 110 to detect suspicious activity. Additionally, the intrusion protection module 106 may manage a firewall. The anti-virus protection module 108 may be another example of a host protection service. In some configurations, the anti-virus protection module 108 may prevent, detect, and/or remove malware, viruses, trojans, spyware, adware, etc.

However, in some cases, one or more of the host protection services may be unavailable. The client device 102 may be vulnerable to infection and/or attack from malicious code when a host protection service is unavailable. For example, the client device 102 may be vulnerable to intrusions when the intrusion protection module 106 is unavailable. In another example, the client device 102 may be vulnerable to viruses when the anti-virus protection module 108 is unavailable.

In some configurations, an update to an OS installed on the client device 102 may result in a termination of one or more host protection services. For example, the OS or an OS updating program may stop one or more services or process associated with a host protection service as part of the update process.

Additionally or alternatively, an update to an application (e.g., host protection software) installed on the client device 102 may result in a termination of one or more host protection services. For example, the OS, the application, or an application updating program may stop one or more services or process associated with a host protection service as part of the update process. In another example, a host protection service may be terminated during a virus definitions update while the application update process unloads the old definitions driver (with the old virus definitions) and loads the new definitions driver (with the new virus definitions). In another example, a host protection service may be terminated (intentionally or accidentally) by an application or during an application update process.

In some embodiments, the client device 102 may include a vulnerability event protection module (VEPM) 104 for applying enhanced secure policies to protect the client device 102 during a vulnerability event. For example, the VEPM 104 may provide protection when the intrusion protection module 106 and/or the anti-virus protection module 108 are unavailable. In some configurations, the VEPM 104 may enforce a predetermined set of security policies to protect the client device 102 during the vulnerability event. For example, the VEPM 104 may enforce a predetermined security policy that blocks communication with any untrusted sources during a vulnerability event.

In some configurations, the VEPM 104 may be used to apply enhanced security policies when one or more of the host protection services (e.g., protection modules) are unavailable. For example, the VEPM 104 may be used to enforce switching from a first set of security policies to a second (enhanced) set of security policies during the vulnerability event. For instance, the VEPM 104 may apply enhanced security policies while the intrusion protection module 106 and/or the anti-virus protection module 108 are unavailable.

In some configurations, the predetermined set of security policies may be based on the current environment of the client device 102. For example, one predetermined set of security policies may be applied when the client device 102 is coupled to a public network 110 and another set of security policies may be applied when the client device is coupled to a trusted corporate network. In some configurations, the predetermined sets of security policies may be managed by a management server. For example, the management server may establish one or more predetermined sets of security policies for various current environment scenarios (e.g., connected to a public network, connected with a VPN connection to a trusted network, connected to a trusted network, connected through a specific internet service provider, etc.). In some configurations, one or more of the devices 112 may be a management server.

Figure 2:
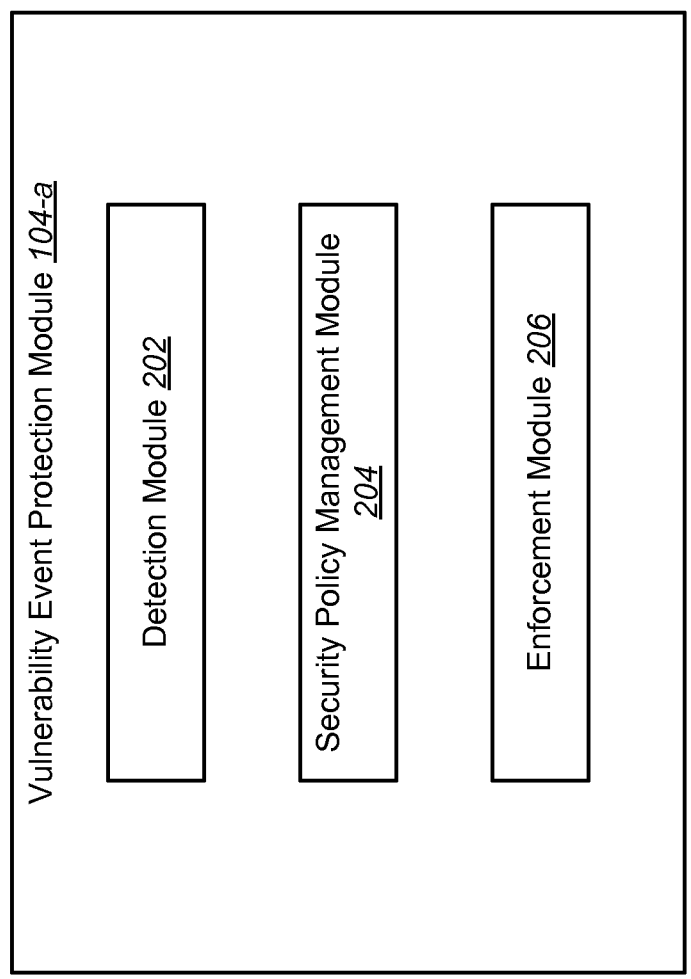
FIG. 2 is a block diagram illustrating one example of a vulnerability event protection module.

FIG. 2 is a block diagram illustrating one example of a vulnerability event protection module (VEPM) 104-a. The VEPM 104-a may be one example of the VEPM 104 illustrated in FIG. 1. In one example, the VEPM 104-a may include a detection module 202, a security policy management module 204, and an enforcement module 206.

In some embodiments, the detection module 202 may detect a vulnerability event. For example, the detection module 202 may detect a termination of a host protection service. In some configurations, the detection module 202 may monitor a client device 102 for possible vulnerability events. For example, the detection module 202 may monitor a client device 102 for notifications of any event (e.g., an update event) that may result in the termination of a host protection service.

In some configurations, the detection module 202 may detect the beginning of a vulnerability event (e.g., when a host protection service is terminated) and the end of a vulnerability event (e.g., when the host protection service is restored). Additionally or alternatively, the detection module 202 may determine if an update event has the effect of (e.g., results in) a termination of a host protection service. For example, some update events may be known to terminate a host protection service, while other update events may be known to not terminate a host protection service. If an update event is known to not terminate a host protection service, then the VEPM 104 may not apply more secure security policies. If an update event is known to terminate a host protection service or it is not known if the update event will terminate a host protection service, then the VEPM 104 may apply more secure policies during the potential vulnerability event (using the systems and methods described herein).

In some embodiments, the security policy management module 204 may monitor the current environment to determine the potential vulnerabilities associated with the current environment. For example, the security policy management module 204 may determine vulnerability levels associated with one or more aspects of the current environment. For instance, the security policy management module 204 may determine that the vulnerability level associated with being coupled to a corporate network is much lower than the vulnerability level associated with being coupled to a public network. In some embodiments, the security policy management module 204 may manage two or more sets of security policies. For example, the security policy management module 204 may manage a first set of security polices that may be enforced when a vulnerability event is not occurring and a second set of security policies that may be enforced when a vulnerability event is occurring. Additionally, the security policy management module 204 may manage the various security policies that may be enforced based on the current environment of the client device 102. In some configurations, the security policy management module 204 may select one or more sets of security policies to apply based on the vulnerability level associated with the current environment. In some cases, the security policy management module 204 may organize and select security policies based on settings (e.g., security policy strategies) received from a management server (that allows an administrator to establish security policy strategies, for example).

In some embodiments, the enforcement module 206 may enforce the set of security policies that was selected to be used by the security policy management module 204. For example, the enforcement module 206 may enforce switching from a first set of security policies to a second set of security policies when a vulnerability event occurs (for the duration of the vulnerability event, for example). In another example, the enforcement module 206 may enforce switching from the second set of security policies back to the first set of security policies when the vulnerability event has ended. In some cases, the second set of security policies may be enforced during the vulnerability event (e.g., the time between when a host protection service was terminated and when the host protection service was restored). In other cases, the second set of security policies may be enforced during the time of the update event (e.g., the time between when the update event begins and when the update event ends). It may be noted, that in some cases, the security policies that are enforced may change as the current environment of the client device 102 changes.

Figure 3:
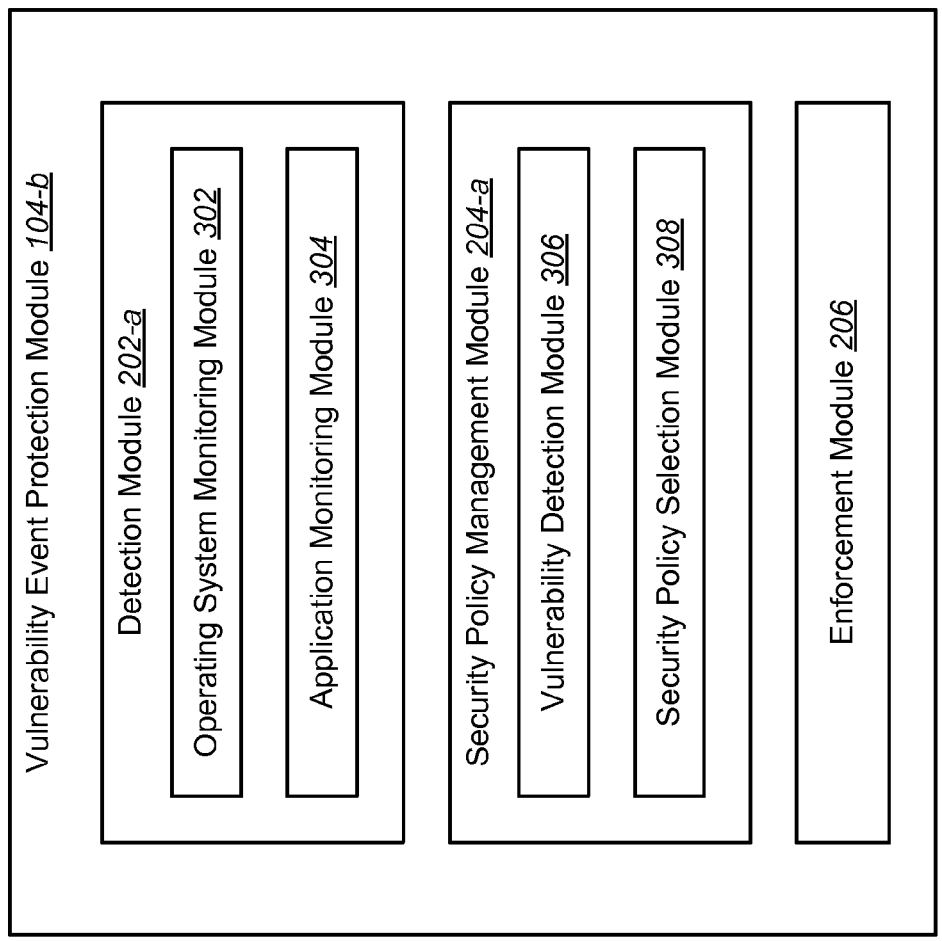
FIG. 3 is a block diagram illustrating another example of a vulnerability event protection module.

FIG. 3 is a block diagram illustrating another example of a VEPM 104-b. The VEPM 104-b may be one example of the VEPM 104 illustrated in FIG. 1 or 2. In some configurations, the VEPM 104-*b* may include a detection module 202-*a*, a security policy management module 204-*a*, and the enforcement module 206.

The detection module 202-*a* may be one example of the detection module 202 illustrated in FIG. 2. In some embodiments, the detection module 202-*a* may include an operating system monitoring module 302 and an application monitoring module 304.

In some embodiments, the operating system monitoring module 302 may monitor the OS of the client device 102 for any event that may result in a termination of a host protection service. For example, the operating system monitoring module 302 may monitor the OS for an OS update (e.g., Windows update event).

In some embodiments, the application monitoring module 304 may monitor an application of the client device 102 for any event that may result in a termination of a host protection service. For example, the application monitoring module 304 may monitor the application, an application updating program, the OS, and/or the client device 102 for an application update. For instance, the application monitoring module 304 may monitor a host protection security software (e.g., Symantec Endpoint Protection) for a host protection security software update.

The security policy management module 204-*a* may be one example of the security policy management module 204 illustrated in FIG. 2. In some embodiments, the security policy management module 204-*a* may include a vulnerability detection module 306 and a security policy selection module 308.

In some embodiments, the vulnerability detection module 306 may detect the vulnerability level(s) associated with the current environment of the client device 102. For example, the vulnerability comparison module 306 may monitor and/or detect the vulnerability level associated with each element that makes up the current environment of the client device 102. Examples of elements that may make up the current environment include: if the client device 102 is coupled to a network 110, what type of network 110 that the client device 102 is coupled to (e.g., public, home, corporate, VPN, etc.), what internet service provider is being used, what resources are being accessed by the client device 102, what resources the client device 102 is attempting to access during a vulnerability event, what applications are running on the client device 102, what applications the client device 102 is attempting to execute during the vulnerability event, etc. In one example, the vulnerability detection module 306 may detect a moderate vulnerability level for the configuration of a client device 102 that is using a VPN connection to connect to a trusted network through a home network. In another example, the vulnerability detection module 306 may detect a high vulnerability level for an application running on the client device 102 that is providing peer-to-peer messaging services.

In some embodiments, the security policy selection module 308 may determine (and select, for example) the security policy and/or set of security policies that should be enforced based on the vulnerability levels of the elements in the current environment (determined by the vulnerability detection module 306, for example). For example, the security policy selection module 308 may select the one or more sets of security policies that should be applied based on a predefined list (described below). In some cases, the predefined list may be predefined by an administrator (via a management server, for example). As described previously, the enforcement module 206 may enforce switching between a first set of selected security policies and a second set of selected security policies (selected by the security policy selection module 308, for example).

Figure 4:
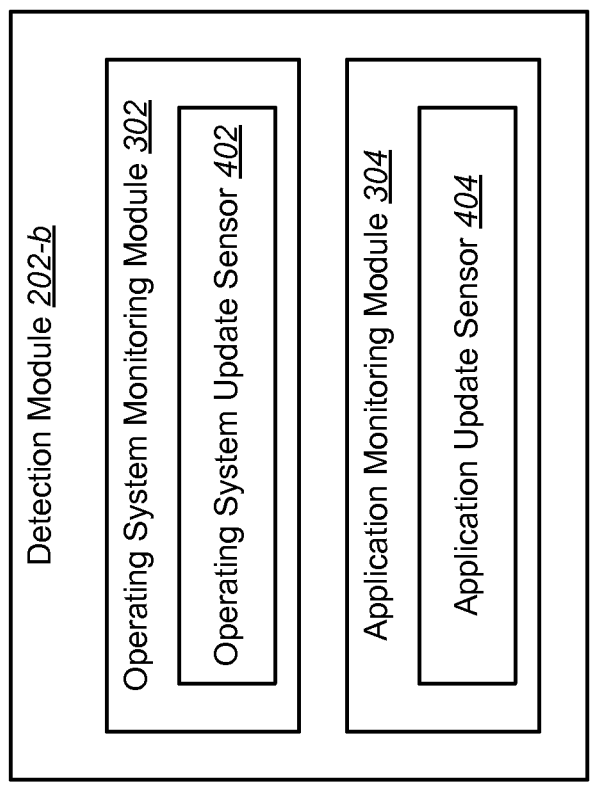
FIG. 4 is a block diagram illustrating one example of a detection module.

FIG. 4 is a block diagram illustrating another example of a detection module 202-*b*. The detection module 202-*b* may be one example of the detection module 202 illustrated in FIG. 2 or 3. In some embodiments, the detection module 202-*b* may include the operating system monitoring module 302 and the application monitoring module 304 described previously.

In some embodiments, the operating system monitoring module 302 may include an operating system update sensor 402. In some configurations, the operating system update sensor 402 may subscribe to update notifications from the OS (e.g., an application programming interface (API) of the OS) to obtain a notification about the occurrence of an OS update. For instance, an operating system update sensor 402 may subscribe to update notifications from a Windows based OS using the Windows API.

In some embodiments, the application monitoring module 304 may include an application update sensor 404. In some configurations, the application update sensor 404 may subscribe to update notifications from any application with any process (e.g., an update process) that may result in a termination of a host protection service. For example, the application update sensor 404 may subscribe to host protection software update notifications. In some cases, the host protection software may include a notification system for providing notifications of updates to the host protection software (Symantec Live Update, for example). For instance, the host protection software may include an API for subscribing to host protection service updates.

Figure 5:
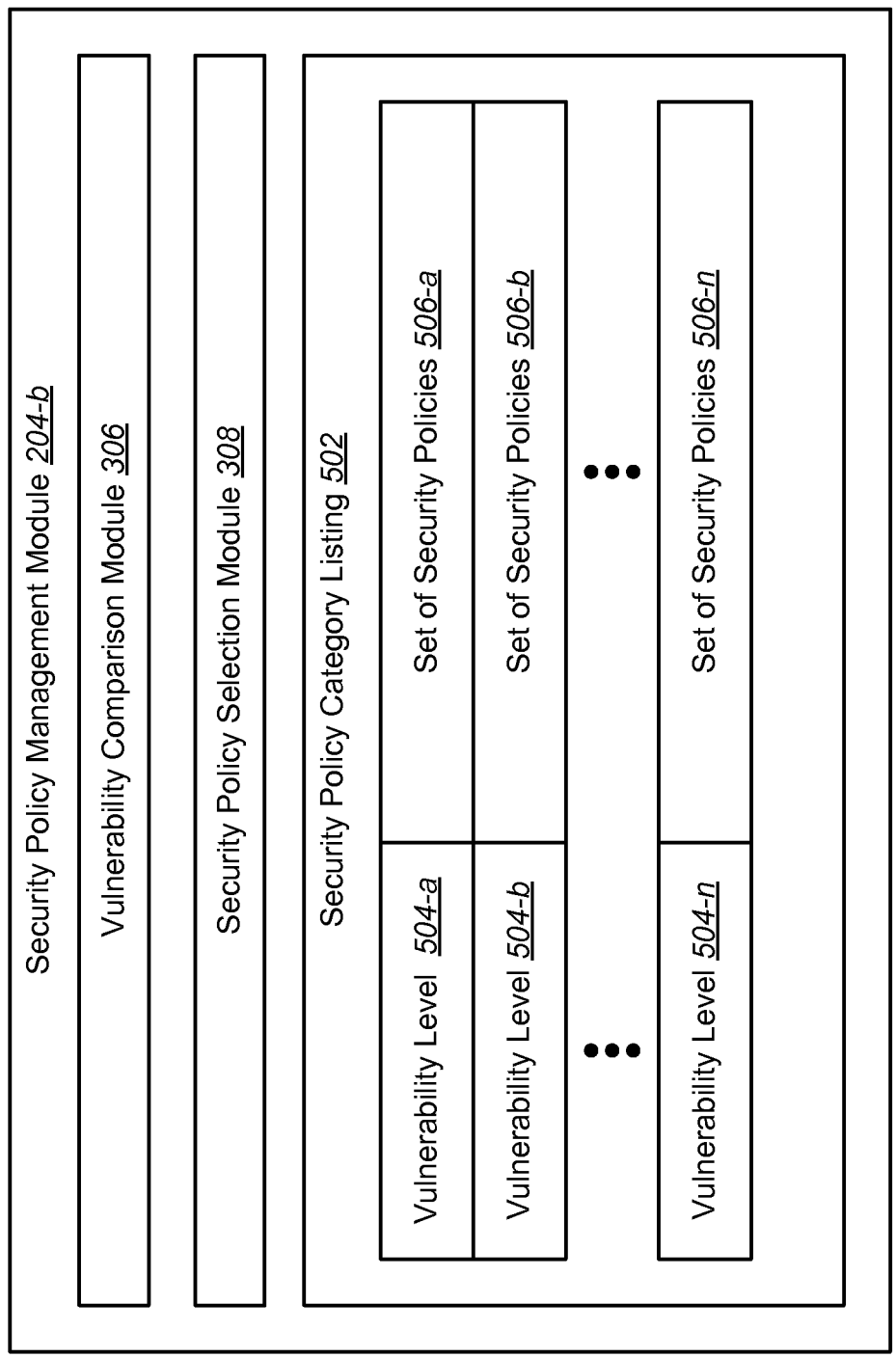
FIG. 5 is a block diagram illustrating one example of a security policy management module.

FIG. 5 is a block diagram illustrating another example of a security policy management module 204-*b*. The security policy management module 204-*b* may be one example of the security policy management module 204 illustrated in FIG. 2 or 3. In some configurations, the security policy management module 204-*b* may include the vulnerability comparison module 306 and the security policy selection module 308 discussed previously. Additionally, the security policy management module 204-*b* may include a security policy category listing 502.

In some embodiments, the security policy category listing 502 may list the set of security policies 506 that correspond to a particular vulnerability level 504. For example, a first set of security policies 506-*a* may correspond to a first vulnerability level 504-*a*, a second set of security policies 506-*b* may correspond to a second vulnerability level 504-*b*, and so forth, such that an nth set of security policies 506-*n* may correspond to an nth vulnerability level 504-*n*.

In one example, a corporate (e.g., trusted) network environment may correspond to a first vulnerability level 504-*a*. For example, the vulnerability level for a corporate network may be low because the corporate network may have enhanced protections (e.g., strong firewall, tight network security) that mitigate certain vulnerabilities. Examples of security policies that may be applied in this situation include restricting the client device 102 from using certain network resources.

In another example, a VPN connection from a home network environment may correspond to a second vulnerability level 504-*b*. For example, the vulnerability level for the VPN connection may be moderate because even though the network traffic may be encrypted to the corporate network, a variety of vulnerabilities may exist from the connection through the home network. Examples of security policies that may be applied in this situation include restricting the computing device 102 from using any of the corporate network's resources.

In yet another example, a public network environment may correspond to an nth vulnerability level 504-*n*. For example, the vulnerability level for the public network may be high because the public network may not provide protection against vulnerabilities and may open the client device 102 to additional vulnerabilities. Examples of security policies that may be applied in this situation include effectively locking down the client device 102 against any connections that exceed a predetermined vulnerability threshold. For instance, exemplary security policies may block network connectivity for untrusted applications (e.g., peer-to-peer messaging services, etc.), restrict program access, block ports that are open, block particular programs from running, etc.

Figure 6:
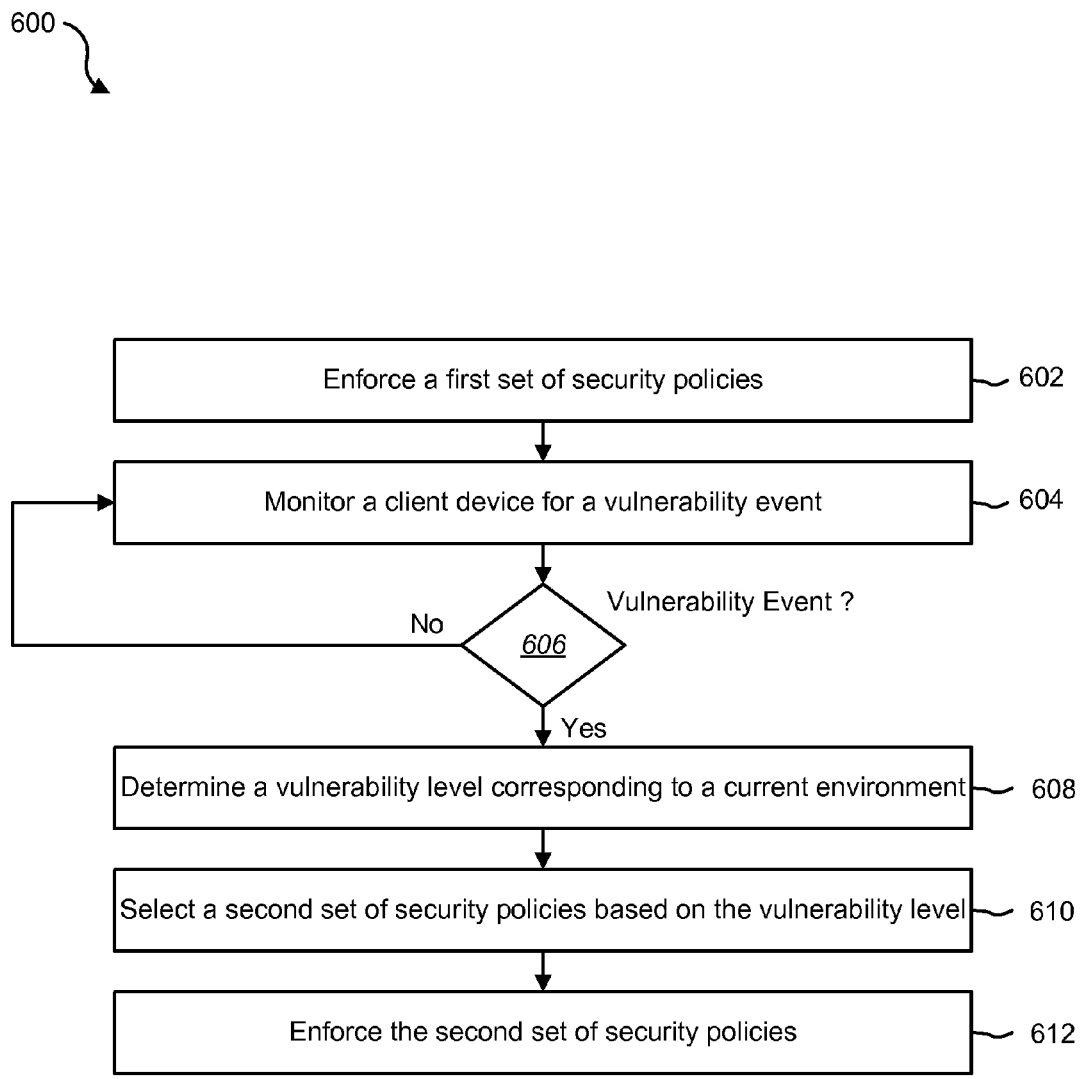
FIG. 6 is a flow diagram illustrating one embodiment of a method to protect against a vulnerability event.

FIG. 6 is a flow diagram illustrating one embodiment of a method 600 to protect against a vulnerability event. In some configurations, the method 600 may be implemented by the VEPM 104 illustrated in FIG. 1, 2, or 3.

At step 602, a first set of security policies may be enforced. For example, the client device 102 may enforce (via the enforcement module 206, for example) a first set of security policies. For example, the first set of security policies may be enforced while the host protective services (e.g., intrusion protection module 106 and/or anti-virus protection module 108) are operable and in effect. At step 604, a client device may be monitored for a vulnerability event. For example, the client device 102 may monitor an OS and/or an application (via the detection module 202, for example) for a termination of a host protection service. At step 606, a determination may be made as to whether a vulnerability event has occurred. Additionally or alternatively, a determination may also be made as to whether a vulnerability event will be occurring. If a vulnerability event has not occurred (or will not be occurring, for example), then the method 600 returns to step 604 (e.g., monitoring a client device for a vulnerability event). If a vulnerability event has occurred (or will be occurring, for example), then the method 600 proceeds to step 608. At step 608, a vulnerability level corresponding to a current environment may be determined. For example, the vulnerability level of a current environment may be determined (via the security policy management module 204, for example). In some configurations, the current environment may be determined by evaluating the way that the client device 102 is connected to a network. At step 610, a second set of security policies may be selected based on the vulnerability level. For example, the second set of security policies may be selected (via the security policy management module 204, for example) based on the vulnerability level. At step 612, the second set of security policies may be enforced. For example, the client device 102 may enforce (via the enforcement module 206, for example) the second set of security policies. For example, the second set of security policies may be enforced while one or more of the host protective services are not operable (e.g., the host protection service has been terminated). In some configurations, the VEPM 104 may switch from enforcing the first set of security policies to enforcing the second set of security policies.

Figure 7:
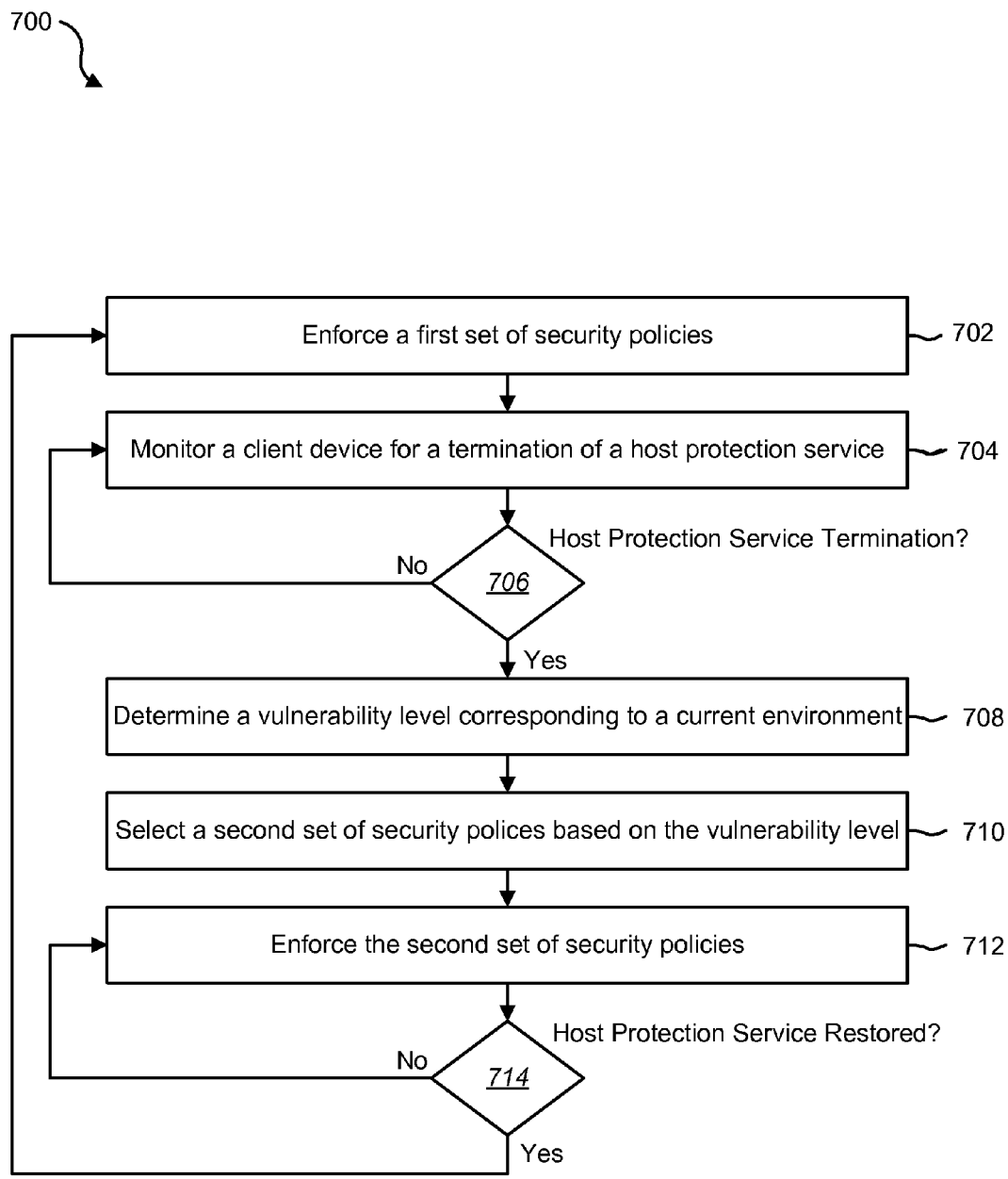
FIG. 7 is a flow diagram illustrating one embodiment of a method to protect against a termination of a host protection service.

FIG. 7 is a flow diagram illustrating one embodiment of a method 700 to protect against a termination of a host protection service. In some configurations, the method 700 may be implemented by the VEPM 104 illustrated in FIG. 1, 2, or 3.

At step 702, a first set of security policies may be enforced. At step 704, a client device may be monitored for termination of a host protection service. At step 706, a determination may be made as to whether a host protection service has been (e.g., or will be) terminated. If a host protection service has not been terminated or if there is not going to be a termination of a host protection service, then the method returns to step 704 (e.g., monitoring a client device for a termination of a host protection service). If a host protection service has been (or is going to be) terminated, then the method continues to step 708. At step 708, a vulnerability level corresponding to the current environment may be determined. At step 710, a second set of security policies may be selected based on the vulnerability level. At step 712, the second set of security policies may be enforced. At step 714, a determination may be made as to whether a host protection service has been restored. For example, the client device 102 may detect (via the detection module 202, for example) whether the host protection service has been restored. If the host protection service has not been restored, then the method returns to step 712 (e.g., enforcing the second set of security policies). If the host protection service has been restored, then the method returns to step 702 (e.g., enforcing the first set of security policies). In some configurations, the VEPM 104 may switch from enforcing the second set of security policies to enforcing the first set of security policies.

Figure 8:
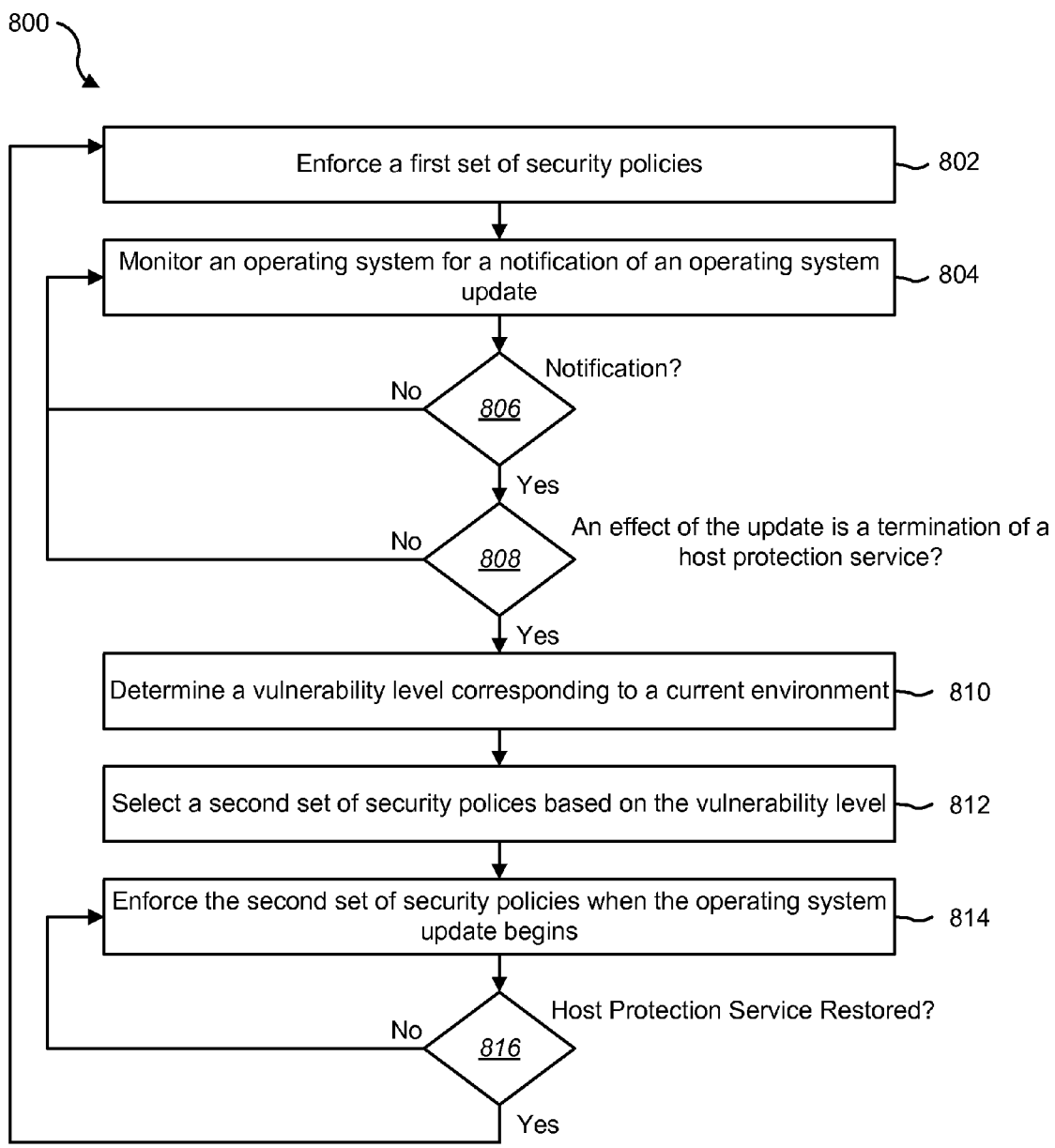
FIG. 8 is a flow diagram illustrating one embodiment of a method to protect against a termination of a host protection service resulting from an operating system update.

FIG. 8 is a flow diagram illustrating one embodiment of a method 800 to protect against a termination of a host protection service resulting from an operating system update. In some configurations, the method 800 may be implemented by the VEPM 104 illustrated in FIG. 1, 2, or 3.

At step 802, a first set of security policies may be enforced. At step 804, an operating system may be monitored for a notification of an operating system update. At step 806, a determination may be made as to whether a notification has been received. If a notification has not been received, then the method 800 returns to step 804 (e.g., monitoring an operating system for a notification of an operating system update). If a notification has been received, then the method 800 proceeds to step 808. At step 808, a determination may be made as to whether an effect of the operating system update is a termination of a host protective service. For example, the client device 102 may detect (via the detection module 202, for example) whether an update will result in a termination of a host protection service. If a host protection service will not be terminated, then the method 800 returns to step 804. If a host protection service will be terminated, then the method proceeds to step 810. At step 810, a vulnerability level corresponding to a current environment may be determined. At step 812, a second set of security policies may be selected based on the vulnerability level. At step 814, the second set of security policies may be enforced when the operating system update begins. Alternatively, the second set of security policies may be enforced when the host protection service is terminated. At step 816, a determination may be made as to whether the host protection service has been restored. If the host protection service has not been restored, then the method 800 returns to step 814 (e.g., enforcing the second set of security policies when the operating system update begins). If the host protection service has been restored (or the operating system update has ended, for example), then the method 800 returns to step 802 (e.g., enforcing the first set of security policies).

Figure 9:
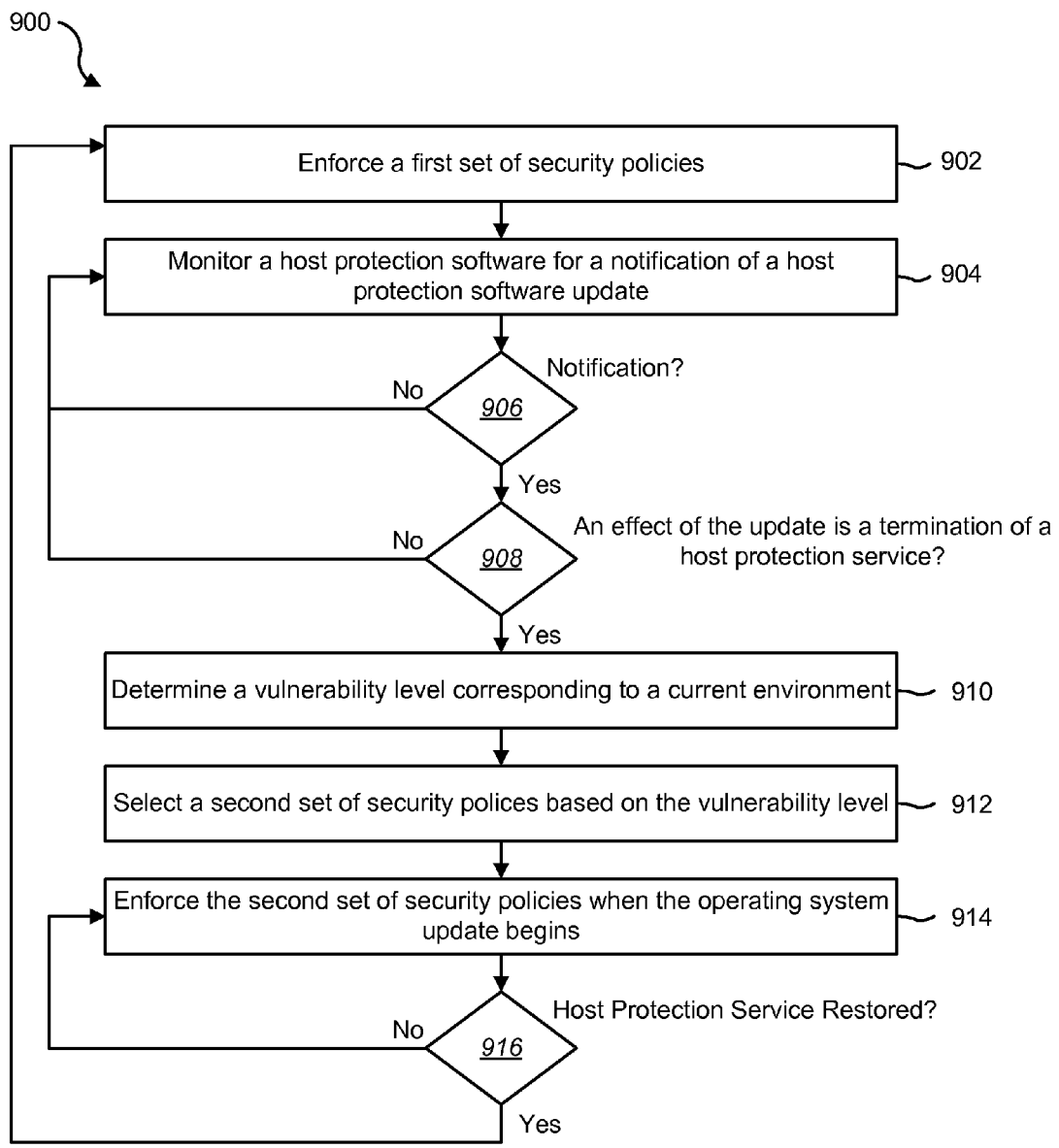
FIG. 9 is a flow diagram illustrating one embodiment of a method to protect against a termination of a host protection service resulting from a host protection software update.

FIG. 9 is a flow diagram illustrating one embodiment of a method 900 for protecting against a termination of a host protection service resulting from a host protection software update. In some configurations, the method 900 may be implemented by the VEPM 104 illustrated in FIG. 1, 2, or 3.

At step 902, a first set of security policies may be enforced. At step 904, a host protection software may be monitored for a notification of a host protection software update. At step 906, a determination may be made as to whether a notification has been received. If a notification has not been received, then the method 900 returns to step 904 (e.g., monitoring a host protection software for a notification of a host protection software update). If a notification has been received, then the method 900 proceeds to step 908. At step 908, a determination may be made as to whether an effect of the host protection software update is a termination of a host protective service. For example, the client device 102 may detect (via the detection module 202, for example) whether an update will result in a termination of a host protection service. If a host protection service will not be terminated, then the method 900 returns to step 904. If a host protection service will be terminated, then the method proceeds to step 910. At step 910, a vulnerability level corresponding to a current environment may be determined. At step 912, a second set of security policies may be selected based on the vulnerability level. At step 914, the second set of security policies may be enforced when the host protection software update begins. Alternatively, the second set of security policies may be enforced when the host protection service is terminated. At step 916, a determination may be made as to whether the host protection service has been restored. If the host protection service has not been restored, then the method 900 returns to step 914 (e.g., enforcing the second set of security policies when the host protection software update begins). If the host protection service has been restored (or the host protection software update has ended, for example), then the method 900 returns to step 902 (e.g., enforcing the first set of security policies).

Figure 10:
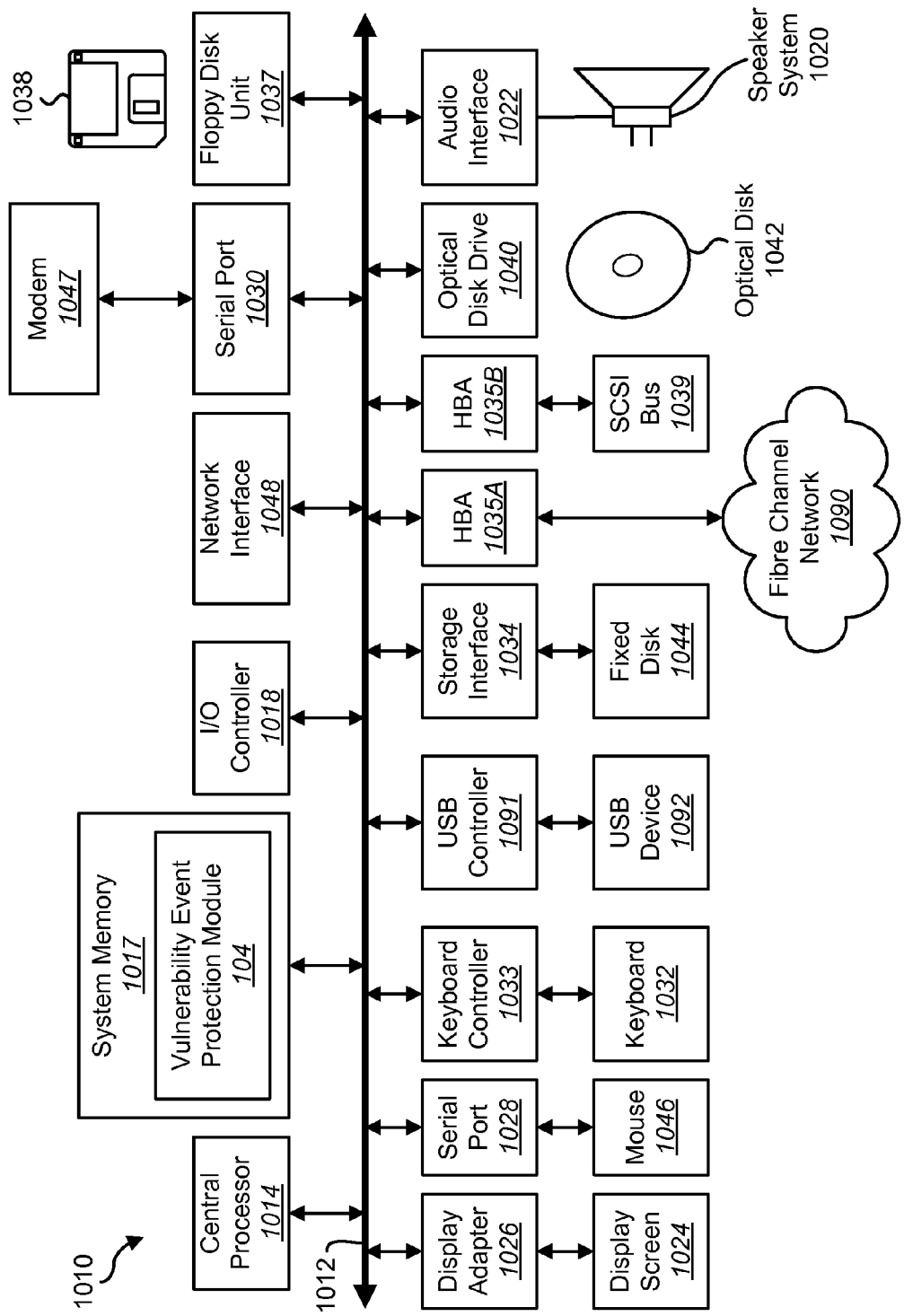
FIG. 10 depicts a block diagram of a computer system suitable for implementing the present systems and methods.

FIG. 10 depicts a block diagram of a computer system 1010 suitable for implementing the present systems and methods. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), multiple USB devices 1092 (interfaced with a USB controller 1091), a storage interface 1034, a floppy disk unit 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the vulnerability event protection module 104 to implement the present systems and methods may be stored within the system memory 1017. Applications resident with computer system 1010 are generally stored on and accessed via a non-transitory computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 10 need not be present to practice the present systems and methods. The devices and subsystems can be interconnected in different ways from that shown in FIG. 10. The operation of a computer system such as that shown in FIG. 10 is readily known in the art and is not discussed in detail in this application. Code to implement the present disclosure can be stored in a non-transitory computer-readable medium such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
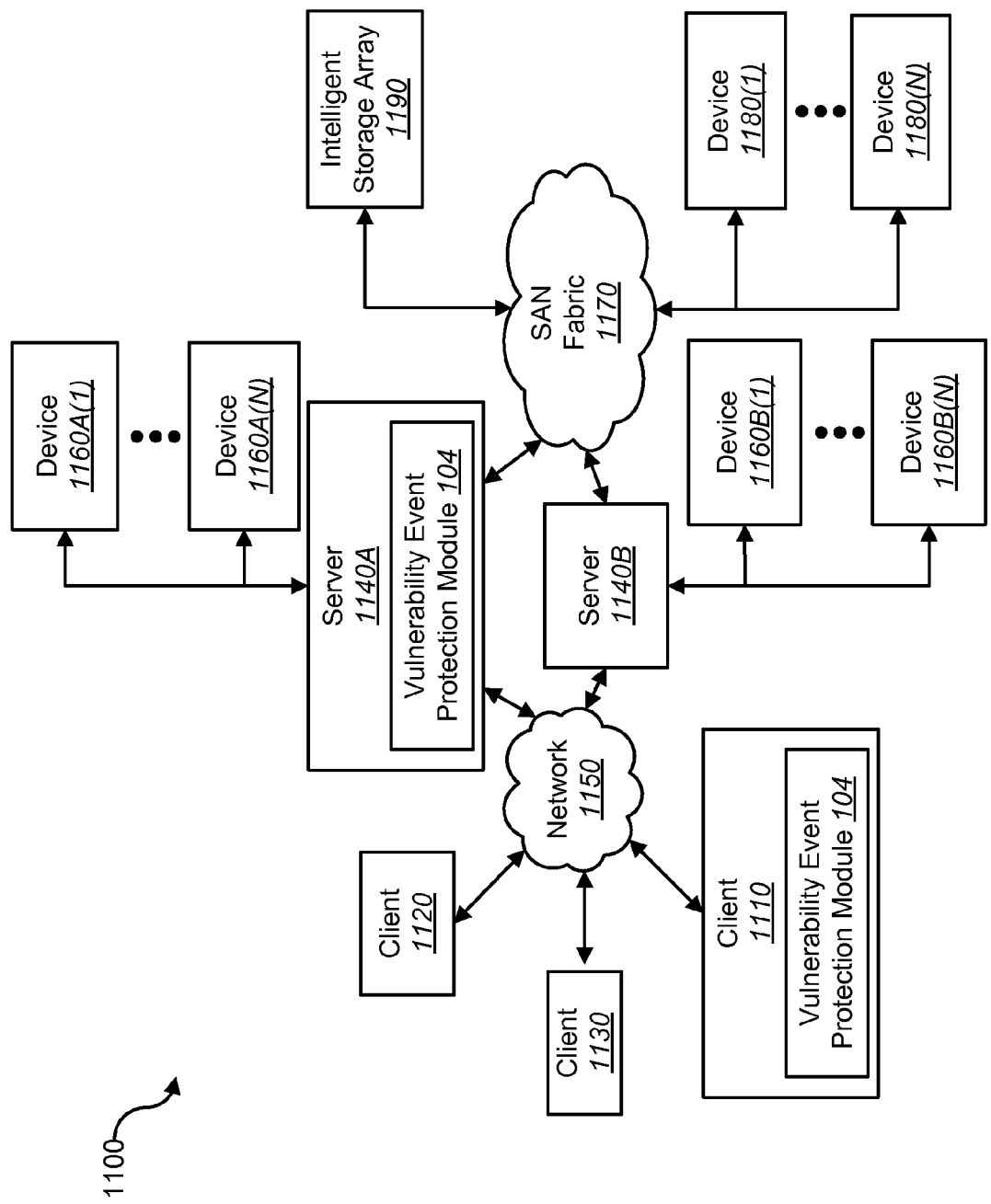
FIG. 11 is a block diagram depicting a network architecture in which client systems, as well as storage servers (any of which can be implemented using a computer system), are coupled to a network.

FIG. 11 is a block diagram depicting a network architecture 1100 in which client systems 1110, 1120 and 1130, as well as storage servers 1140A, 1140B (any of which can be implemented using computer system 1010), are coupled to a network 1150. In one embodiment, the vulnerability event protection module 104 may be located within the storage servers 1140A, 1140B and/or the client systems 1110, 1120, 1130 to implement the present systems and methods. The storage server 1140A is further depicted as having storage devices 1160A(1)-(N) directly attached, and storage server 1140B is depicted with storage devices 1160B(1)-(N) directly attached. SAN fabric 1170 supports access to storage devices 1180(1)-(N) by storage servers 1140A, 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048, or some other method can be used to provide connectivity from each of client computer systems 1110, 1120, and 1130 to network 1150. Client systems 1110, 1120, and 1130 are able to access information on storage server 1140A or 1140B using, for example, a web browser or other client software (not shown). Such a client allows client systems 1110, 1120, and 1130 to access data hosted by storage server 1140A or 1140B or one of storage devices 1160A(1)-(N), 1160B(1)-(N), 1180(1)-(N) or intelligent storage array 1190. FIG. 11 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to protect against a vulnerability event, comprising:
    enforcing, by a processor, a first set of security policies on a client device, wherein the processor is a hardware processor;
    subscribing, by the processor, to an update notification service to obtain notifications regarding update events, the update events relating to operating system updates and host protection software updates;
    monitoring, by the processor, the updated events, wherein monitoring the update events comprises monitoring the update events relating to the operating system and host protection software in relation to termination of a malware detection service;
    detecting, by the processor, an update event in conjunction with subscribing to the update notification service;
    determining, by the processor, whether the update event is known to cause temporary disruption to the malware detection service;
    upon determining the update event is known to not cause temporary disruption to the malware detection service, maintaining, by the processor, the first set of security policies; and
    upon determining the update event is known to cause temporary disruption to the malware detection service:
        determining, by the processor, a vulnerability level corresponding to a first type of network connection or a second type of network connection, wherein the vulnerability level is at a first level when a current network connection is of the first type and the vulnerability level is at a second level when the current network connection is of the second type;
        selecting, by the processor, a second set of security policies based on the vulnerability level; and
        enforcing, by the processor, the second set of security policies.

2. The method of claim 1, wherein the second set of security policies is enforced upon the occurrence of the vulnerability event.

3. The method of claim 1, wherein enforcing the second set of security policies comprises switching from enforcing the first set of security policies to enforcing the second set of security policies.

4. The method of claim 1, further comprising:
    monitoring the client device for an end of the vulnerability event; and
    upon detecting the end of the vulnerability event, enforcing the first set of security policies.

5. The method of claim 4, wherein enforcing the first set of security policies comprises switching from enforcing the second set of security policies to enforcing the first set of security policies.

6. A computing device configured to protect against a vulnerability event, comprising:
    a processor;
    memory in electronic communication with the processor, wherein the memory stores computer executable instructions that, when executed by the processor, cause the processor to:
        enforce a first set of security policies on a client device;

subscribe to an update notification service to obtain notifications regarding update events, the update events relating to operating system updates and host protection software updates;

monitoring, by the processor, the updated events, wherein monitoring the update events comprises monitoring the date events relating to the operating system and host protection software in relation to termination of malware detection service;

detect an update event in conjunction with subscribing to the update notification service;

determine whether the update event is known to cause temporary disruption to the malware detection service;

upon determining the update event is known to not cause temporary disruption to the malware detection service, maintain the first set of security policies; and upon determining the update event is known to cause temporary disruption to the malware detection service:

determine a vulnerability level corresponding to a first type of network connection or a second type of network connection, wherein the vulnerability level is at a first level when a current network connection is of the first type and the vulnerability level is at a second level when the current network connection is of the second type;

select a second set of security policies based on the vulnerability level; and enforce the second set of security policies.

7. The computing device of claim 6, wherein the second set of security policies is enforced upon the occurrence of the vulnerability event.

8. The computing device of claim 6, wherein enforcing the second set of security policies comprises switching from enforcing the first set of security policies to enforcing the second set of security policies.

9. The computing device of claim 6, wherein the processor is further configured to:

monitor the client device for an end of the vulnerability event; and upon detecting the end of the vulnerability event, enforce the first set of security policies.

10. The computing device of claim 9, wherein enforcing the first set of security policies comprises switching from enforcing the second set of security policies to enforcing the first set of security policies.

11. A computer-program product to protect against a vulnerability event, the computer-program product comprising a non-transitory computer-readable storage medium that stores computer executable instructions that, when executed by a processor, cause the processor to:

enforce a first set of security policies on a client device;

subscribe to an update notification service to obtain notifications regarding update events, the update events relating to operating system updates and host protection software updates;

monitoring, by the processor, the updated events, wherein monitoring the update events comprises monitoring the update events relating to the operating system and host protection software in relation to termination of a malware detection service;

detect an update event in conjunction with subscribing to the update notification service;

determine whether the update event is known to cause temporary disruption to the malware detection service;

upon determining the update event is known to not cause temporary disruption to the malware detection service, maintain the first set of security policies; and upon determining the update event is known to cause temporary disruption to the malware detection service:

determine a vulnerability level corresponding to a first type of network connection or a second type of network connection, wherein the vulnerability level is at a first level when a current network connection is of the first type and the vulnerability level is at a second level when the current network connection is of the second type;

select a second set of security policies based on the vulnerability level; and enforce the second set of security policies.

\* \* \* \* \*